R. V. JONES.
Sausage Stuffer.
No. 22,559.
Patented Jan'y 11, 1859.
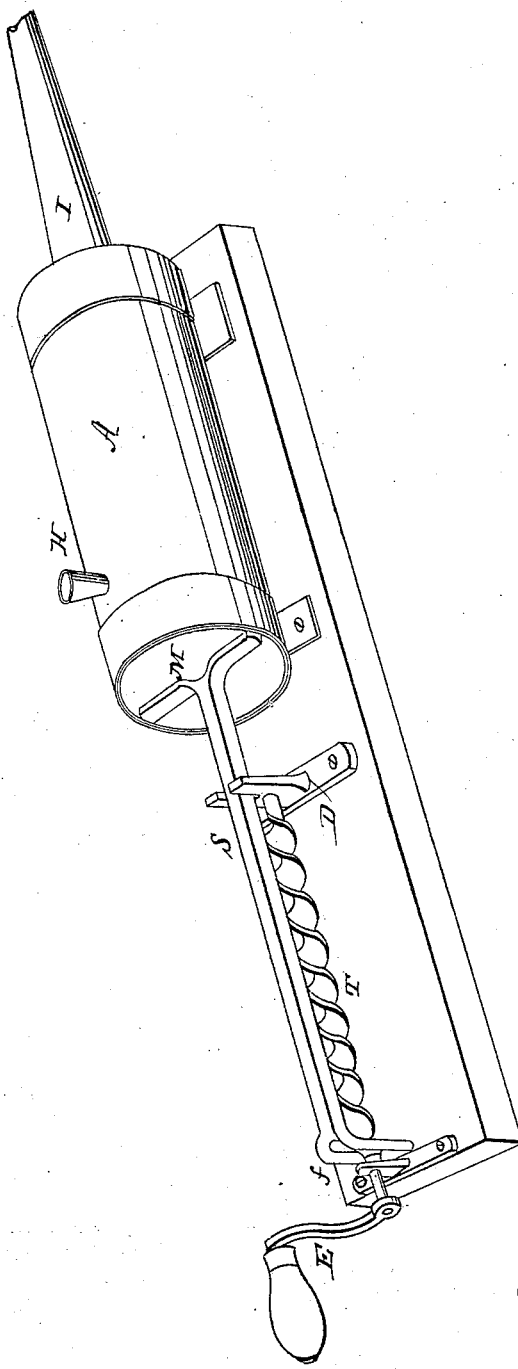

UNITED STATES PATENT OFFICE.

R. V. JONES, OF JOHNSTOWN, PENNSYLVANIA.

SAUSAGE-STUFFER.

Specification of Letters Patent No. 22,559, dated January 11, 1859.

*To all whom it may concern:*

Be it known that I, R. V. JONES, of Johnstown, in the county of Cambria and State of Pennsylvania, have invented a certain new and Improved Machine for Stuffing Sausages; and I do hereby declare that the following is a full, clear, and exact description thereof, reference being had to the accompanying drawing, representing a perspective view of the same, and to the letters of reference marked thereon.

To enable others skilled in the art to make and use my invention I will proceed to describe its construction and operation.

A is a hollow cylinder into which the minced meat is placed through the hopper or funnel (H), said cylinder being open at one end for the admission of the piston, M, and at the other having a nozzle or tube (P). The end of this tube is beveled for the greater convenience of inserting the finger or thumb into the end of the gut to draw the same thereon.

The piston, M, is firmly secured to the piston rod on bar (S). Said bar is furnished with a pronged nut (f) which by the direct or reverse rotation of the crank (E) and endless screw (T) travels forward or backward along the screw and secured from raising by the dovetail slot in the top of the stand D the piston rod or bar being made a dovetail form so as to correspond with the slot in the stand D also prevents the piston from turning while in motion, giving a reciprocating action to the piston, which as it enters the cylinder, forces the meat in a continued column into the gut or other receptacle placed on the end of the tube (P) to receive it, the pronged nut being left open so that when the piston rod or bar (S) is drawn back, the piston bar being smaller at the end in the stand D the same can be removed without difficulty for cleansing.

It will thus be seen that my machine, uniting efficacy of action with great simplicity of construction, renders it at once useful and economical.

I am aware that screws have been used in presses of various kinds. I therefore do not claim the screw in pressing or stuffing sausages, but What I do claim and desire to secure by Letters Patent is:

The piston rod and supporting recess, constructed as described, in combination with the pronged nut and screw, for the purpose specified.

R. V. JONES.

Witnesses:
   S. L. GORGAS,
   JAMES PURSE.